US008363563B2

(12) United States Patent
Ko et al.

(10) Patent No.: US 8,363,563 B2
(45) Date of Patent: Jan. 29, 2013

(54) APPARATUS AND METHOD FOR DELAY TIME COMPUTATION AND DELAY COMPENSATION BETWEEN BASE STATION AND REMOTE RADIO FREQUENCY UNIT IN BROADBAND WIRELESS ACCESS SYSTEM

(75) Inventors: Tae-Hwan Ko, Hwaseong-si (KR); Wook Kim, Suwon-si (KR); Ik-Gon Kim, Hwaseong-si (KR); Jae-Jin Kim, Seoul (KR); Hyun-Jin Yoon, Suwon-si (KR); Ji-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 478 days.

(21) Appl. No.: 12/683,663

(22) Filed: Jan. 7, 2010

(65) Prior Publication Data

US 2010/0172262 A1 Jul. 8, 2010

(30) Foreign Application Priority Data

Jan. 8, 2009 (KR) ........................ 10-2009-0001374

(51) Int. Cl.
*H04L 12/26* (2006.01)
(52) U.S. Cl. ....................................................... 370/252
(58) Field of Classification Search .................. 370/252, 370/339, 350
See application file for complete search history.

(56) References Cited

U.S. PATENT DOCUMENTS

| 5,953,384 A * | 9/1999 | Walsh et al. .................. 375/354 |
| 7,200,391 B2 * | 4/2007 | Chung et al. .................. 455/423 |
| 7,372,846 B2 * | 5/2008 | Zwack .......................... 370/352 |

* cited by examiner

*Primary Examiner* — Mark Rinehart
*Assistant Examiner* — Mohammad Anwar
(74) *Attorney, Agent, or Firm* — Jefferson IP Law, LLP

(57) ABSTRACT

An apparatus and method for delay time computation and delay compensation between a Base Station (BS) and a remote Radio Frequency (RF) unit in a broadband wireless access system are provided. In a method of operating an apparatus for determining a delay time to compensate for delay between a BS modem card and a remote RF unit in a wireless access system, the method includes determining a process delay time required when traffic data is output from the BS modem card to an antenna of the remote RF unit in a state where a reference cable having a length short enough to neglect a cable delay time is connected between the BS modem card and the remote RF unit, determining a cable delay time required when a sync pulse signal is transmitted through a cable used in actual system operation between the BS modem card and the remote RF unit, and determining a time for outputting traffic data at an earlier time from a modem included in the BS modem card by using the determined process delay time and cable delay time.

20 Claims, 4 Drawing Sheets

APPARATUS AND METHOD FOR DELAY TIME COMPUTATION AND DELAY COMPENSATION BETWEEN BASE STATION AND REMOTE RADIO FREQUENCY UNIT IN BROADBAND WIRELESS ACCESS SYSTEM

PRIORITY

This application claims the benefit under 35 U.S.C. §119 (a) of a Korean patent application filed in the Korean Intellectual Property Office on Jan. 8, 2009 and assigned Serial No. 10-2009-0001374, the entire disclosure of which is hereby incorporated by reference.

BACKGROUND OF THE INVENTION

1. Field of the Invention

The present invention relates to an apparatus and method for delay time computation and delay compensation between a Base Station (BS) and a remote Radio Frequency (RF) unit in a broadband wireless access system. More particularly, the present invention relates to an apparatus and method for performing operations by achieving synchronization between a BS and a plurality of cascade remote RF units in a broadband wireless access system, irrespective of the number of remote RF units.

2. Description of the Related Art

A time delay factor of traffic data is very important in a Time Division Duplex (TDD) system such as a mobile-WiMax system. The time delay factor may be classified into two types. One is a data process delay time required until traffic data is output to an antenna after output from a modem of a Base Station (BS), and the other is a cable delay time depending on a length of a cable used to connect a BS modem card having a modem and a Radio Frequency (RF) unit when the BS modem card is remotely separated from the RF unit. The two types of delay time need to be correctly determined and compensated for, so that communication may be smoothly achieved between the BS and a Mobile Station (MS). More particularly, unlike the process delay time which is always constant after the system design is complete, the cable delay time is variable depending on an installation environment and a cable type, and thus delay time computation must be correctly performed on a real-time basis and must be correctly compensated for according to a desired system level.

FIG. 1 is a block diagram illustrating a BS modem card and a remote RF unit in a conventional broadband wireless access system.

As shown in FIG. 1, a BS modem card 100, equipped with a modem 101, is connected to a remote RF unit 140 via a cable. A signal output from the modem 101 is transmitted through an antenna 150 via the remote RF unit 140. A time for transmitting this signal must be equal to a time required when the signal output from the modem 101 is transmitted through an antenna 130 via an RF unit 120 included in a BS. Each of the RF unit 120 included in the BS and the remote RF unit 140 includes a transceiver module, an amplifier, and a filter.

At present, an interface mechanism between the BS modem card and the remote RF unit of the broadband wireless access system and a definition thereof are actively being discussed using a Common Public Radio Interface (CPRI) international standard. More particularly, a mechanism of delay time computation for each section between the BS modem card and the remote RF unit in a TDD system (e.g., mobile-WiMax) is defined in CPRI specification v3.0 revised in 2006.

However, since the mechanism disclosed in the CPRI and designed for delay time computation is a theoretical method, it is very difficult to select and determine a point of computation in the system. In addition, the number of computation blocks to be additionally implemented for computation is a plural number. Therefore, there is a need for a method for determining a delay time between the BS modem card and the remote RF unit by considering a practical design of the broadband wireless access system and a method for compensating for the delay time.

SUMMARY OF THE INVENTION

An aspect of the present invention is to address at least the above-mentioned problems and/or disadvantages and to provide at least the advantages described below. Accordingly, an aspect of the present invention is to provide an apparatus and method for time delay computation and delay compensation between a Base Station (BS) and a remote Radio Frequency (RF) unit according to a practical design of a broadband wireless access system.

Another aspect of the present invention is to provide an apparatus and method for performing operations by achieving synchronization between a BS and a plurality of cascade remote RF units in a broadband wireless access system, irrespective of the number of remote RF units.

Another aspect of the present invention is to provide an apparatus and method for determining a process delay time required when traffic data is output from a BS to an antenna of a remote RF unit in a state where a reference cable is connected, wherein the reference cable has a length short enough to neglect a cable delay time and is connected between the BS and the remote RF unit in a broadband wireless access system.

Another aspect of the present invention is to an apparatus and method for determining a cable delay time by determining and using a time required when a sync pulse signal returns to a BS via a remote RF unit from the BS in a state where a reference cable is connected, wherein the reference cable has a length short enough to neglect the cable delay time and is connected between the BS and the remote RF unit, and a time required when the pulse sync signal returns to the BS via the remote RF unit from the BS in a state where a new cable is connected by replacing an old cable to the new cable used in actual system operation in a broadband wireless access system.

Another aspect of the present invention is to an apparatus and method for determining a time for outputting traffic data at an earlier time from a modem included in a BS by using a process delay time and a cable delay time between the BS and a remote RF unit in a broadband wireless access system.

Another aspect of the present invention is to an apparatus and method for determining an internal buffer delay time for output synchronization between a BS and a remote RF unit by using a process delay time between the BS and a remote RF unit, a cable delay time between the BS and a remote RF unit, and a time for outputting traffic data at an earlier time from a modem included in the BS in a broadband wireless access system.

Another aspect of the present invention is to an apparatus and method for determining a delay time required when a sync pulse signal returns to a BS via a remote RF unit from the BS in a state where a reference cable is connected, wherein the reference cable has a length short enough to neglect a cable delay time and is connected between the BS and the remote RF unit, and for determining a reference location change time for output synchronization between the BS and the remote RF unit by using the determined delay time and the cable delay time.

In accordance with an aspect of the present invention, a method for determining a delay time to compensate for delay between a BS modem card and a remote RF unit in a wireless access system is provided. The method includes determining a process delay time required when traffic data is output from the BS modem card to an antenna of the remote RF unit in a state where a reference cable having a length short enough to neglect a cable delay time is connected between the BS modem card and the remote RF unit, determining a cable delay time required when a sync pulse signal is transmitted through a cable used in actual system operation between the BS modem card and the remote RF unit, and determining a time for outputting traffic data at an earlier time from a modem included in the BS modem card by using the determined process delay time and cable delay time.

In accordance with another aspect of the present invention, an apparatus for determining a delay time to compensate for delay between a BS modem card and a remote RF unit in a wireless access system is provided. The apparatus includes a signal delay computation unit for determining a process delay time required when traffic data is output from the BS modem card to an antenna of the remote RF unit in a state where a reference cable having a length short enough to neglect a cable delay time is connected between the BS modem card and the remote RF unit, a first pulse difference counter for determining a cable delay time required when a sync pulse signal is transmitted through a cable used in actual system operation between the BS modem card and the remote RF unit, and a modem, included in the BS modem card, for determining a time for outputting traffic data at an earlier time from the modem included in the BS modem card by using the determined process delay time and cable delay time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, an apparatus and method for delay time computation and delay compensation between a Base Station (BS) and a remote Radio Frequency (RF) unit in a broadband wireless access system will be described. The BS denotes a BS modem card equipped with a modem. The BS modem card is connected to the remote RF unit via a cable. Although one remote RF unit is connected to the BS modem card via the cable in a system described below for example, the present invention may also apply to a system having a plurality of cascade remote RF units, irrespective of the number of cascade remote RF units.

Figure 1:
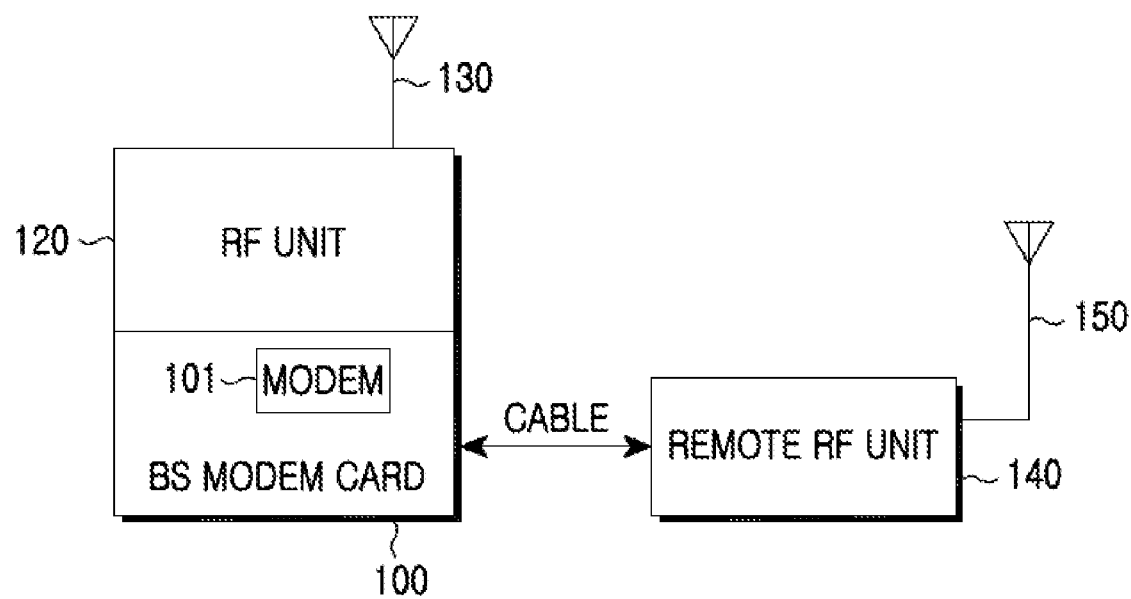
FIG. 1 is a block diagram illustrating a Base Station (BS) modem card and a remote Radio Frequency (RF) unit in a conventional broadband wireless access system.
Figure 2:
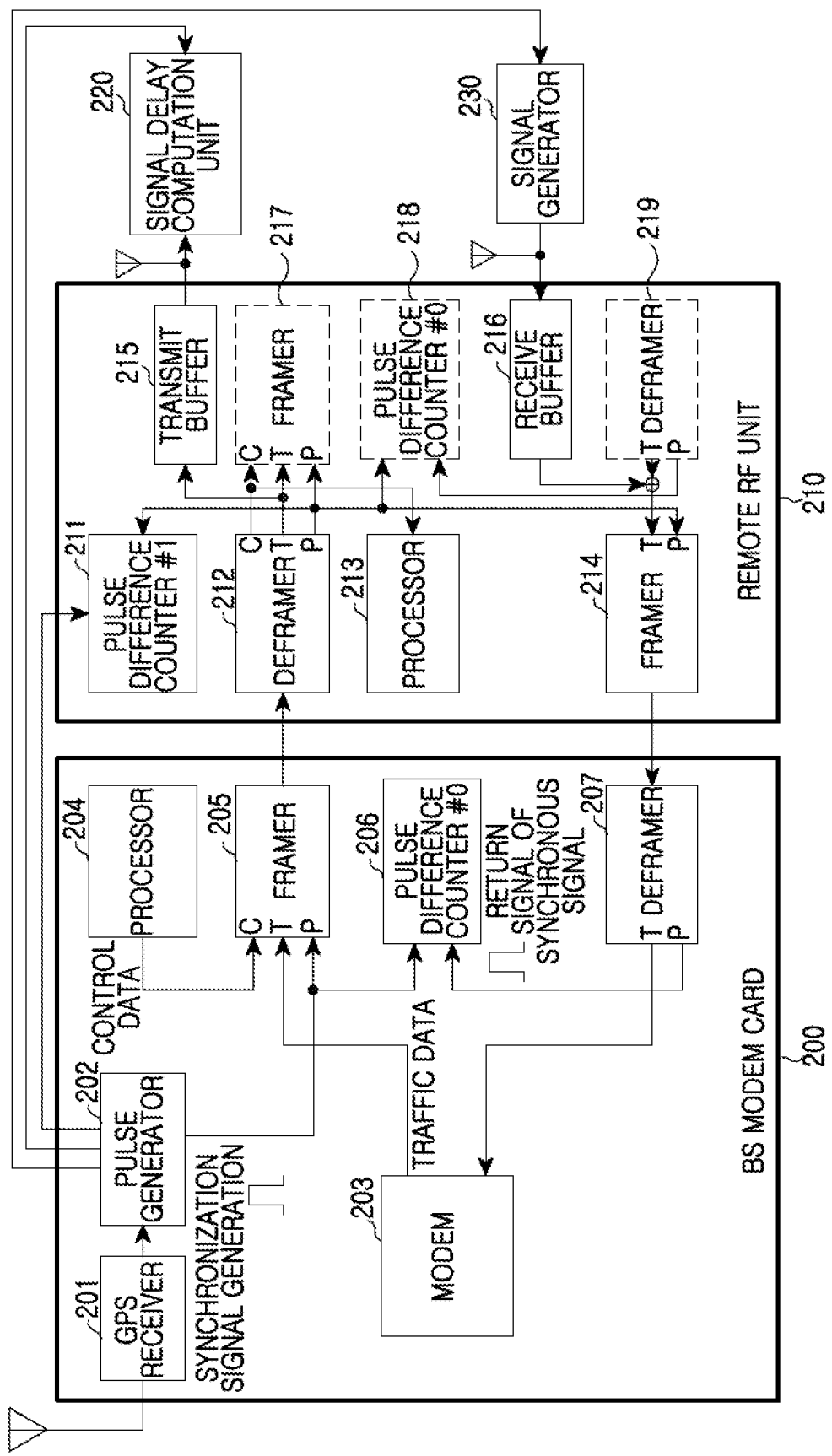
FIG. 2 is a block diagram illustrating an apparatus for determining a delay time between a BS modem card and a remote RF unit in a broadband wireless access system according to an exemplary embodiment of the present invention.

FIG. 2 is a block diagram illustrating an apparatus for determining a delay time between a BS modem card and a remote RF unit in a broadband wireless access system according to an exemplary embodiment of the present invention.

Referring to FIG. 2, a BS modem card 200 includes a Global Positioning System (GPS) receiver 201, a pulse generator 202, a modem 203, a processor 204, a framer 205, a pulse difference counter #0 206, and a deframer 207. A remote RF unit 210 includes a pulse difference counter #1 211, a deframer 212, a processor 213, a framer 214, a transmit buffer 215, and a receive buffer 216. If another remote RF unit is cascaded to the remote RF unit 210, the remote RF unit 210 may further include a framer 217, a pulse difference counter #0 218, and a deframer 219 to respectively perform the same functions as the framer 205, the pulse difference counter #0 206, and the deframer 207 included in the BS modem card 200. A transmit antenna of the remote RF unit 210 is connected to a signal delay computation unit 220. A receive antenna of the remote RF unit 210 is connected to a signal generator 230.

In the BS modem card 200 of FIG. 2, the GPS receiver 201 included in the BS modem card 200 receives a GPS signal from a GPS satellite and then outputs the GPS signal.

The pulse generator 202 uses the GPS signal received from the GPS receiver 201 to generate and output a sync pulse signal that may be used as a reference signal for delay time computation. The sync pulse signal indicates a frame start position.

The modem 203 generates and outputs traffic data to be transmitted to a receiving side through an antenna. In this case, the modem 203 uses a process delay time $T_{0,process}$ determined by the signal delay computation unit 220 and a cable delay time $T_{0,cable}$ determined by the pulse difference counter #0 206 to determine a time $T_{advanced}$ for outputting traffic data at an earlier time from the modem 203 included in the BS modem card 200. Then, the modem 203 outputs the traffic data at a time earlier by the determined time. The time $T_{advanced}$ may be determined by a software block (not shown). The modem 203 may receive the determined time $T_{advanced}$ from the software block (not shown) and then output traffic data at a time earlier by that time.

The processor 204 generates and outputs control data for controlling the remote RF unit 210.

The framer 205 generates one frame by using the control data output from the processor 204, the traffic data output from the modem 203, and the sync pulse signal output from the pulse generator 202, and outputs the generated frame to the deframer 212 of the remote RF unit 210 through the cable.

The pulse difference counter #0 206 compares the sync pulse signal output from the pulse generator 202 to the framer 205 with a sync pulse signal which is output to the deframer 212 of the remote RF unit 210 via the framer 205 and returns via the framer 214 of the remote RF unit 210 and the deframer 207 of the BS modem card 200, and then determines a time difference between the sync pulse signals of the BS modem card 200 and the remote RF unit 210. That is, the pulse difference counter #0 206 determines a time difference between the sync pulse signal transmitted from the BS modem card 200 and the sync pulse signal returning to the BS modem card 200 via the remote RF unit 210. More particularly, the pulse difference counter #0 206 determines a default offset time $T_{default,offset}$ required when the sync pulse signal returns to the BS modem card 200 via the remote RF unit 210 from the BS modem card 200 in a state where a reference cable is connected and a delay time $T_{delay}$ required when the sync pulse signal returns to the BS modem card 200 via the remote RF unit 210 from the BS modem card 200 in a state where a cable used in actual system operation is connected. Then, by using the determined default offset time and delay time, the pulse difference counter #0 206 determines the cable delay time $T_{0,cable}$. When a plurality of remote RF units are cascaded to the BS modem card 200, the cable delay time determined as described above is delivered to another remote RF unit cascaded thereto, so that a specific remote RF unit may determine its cable delay time by using the cable delay time of the remote RF unit 210 connected to the BS modem card 200.

The deframer 207 receives one frame from the framer 214 of the remote RF unit 210 through a cable, and separates traffic data and a sync pulse signal from the received frame. Thereafter, the deframer 207 outputs the separated traffic data to the modem 203, and outputs the separated sync pulse signal to the pulse difference counter #0 206. The sync pulse signal is a signal which is output to the deframer 212 of the remote RF unit 210 via the framer 205 and then returns via the framer 214 of the remote RF unit 210.

In the remote RF unit 210 of FIG. 2, the pulse difference counter #1 211 of the remote RF unit 210 compares a sync pulse signal output from the pulse generator 202 of the BS modem card 200 with a sync pulse signal which is output from the pulse generator 202 in a state where the reference cable is connected and is then output to the deframer 212 of the remote RF unit 210 via the framer 205, and determines a time difference between the sync pulse signals of the BS modem card 200 and the remote RF unit 210. The time difference is a delay time $T_{0,d\_sync}$ required when the sync pulse signal is delivered from the BS modem card 200 to the remote RF unit 210. Further, the pulse difference counter #1 211 uses the determined time $T_{0,d\_sync}$ and the cable delay time $T_{0,cable}$ determined by the pulse difference counter #0 206 to determine a reference location change time $T_{0,adv\_sync}$ for output synchronization between the BS modem card 200 and the remote RF unit 210, and uses the determined time $T_{0,adv\_sync}$ to synchronize the sync pulse signals between the BS modem card 200 and the remote RF unit 210.

The deframer 212 receives one frame from the framer 205 of the BS modem card 200 through a cable, and separates control data, traffic data, and a sync pulse signal from the received frame. Thereafter, the deframer 212 outputs the separated control data to the processor 213, outputs the separated traffic data to the transmit buffer 215, and outputs the separated sync pulse signal to the pulse difference counter #1 211 and the framer 214.

If another remote RF unit is cascaded to the remote RF unit 210, the deframer 212 outputs the separated control data, traffic data, and sync pulse signal to the framer 217. In this case, the pulse difference counter #0 218 compares the sync pulse signal output from the deframer 212 to the framer 217 with a sync pulse signal which is output to a deframer of the aforementioned other remote RF unit via the framer 217 and then returns via the deframer of the aforementioned other remote RF unit and the deframer 219 of the remote RF unit 210, and determines a time difference between the sync pulse signals of the remote RF unit 210 and the aforementioned other remote RF unit. In this case, the deframer 219 receives one frame from the framer of the aforementioned or another remote RF unit through the cable, and separates traffic data and a sync pulse signal from the received frame. Thereafter, the deframer 219 outputs the separated traffic data to the framer 214, and outputs the separated sync pulse signal to the pulse difference counter #0 218.

The processor 213 receives control data from the deframer 212 and controls the remote RF unit 210.

The framer 214 generates one frame by using the sync pulse signal output from the deframer 212 and traffic data output from the receive buffer 216 and the deframer 219, and outputs the generated frame to the deframer 207 of the BS modem card 200 through the cable.

The transmit buffer 215 buffers traffic data to be transmitted to the receiving side through the antenna, and is used for achieving synchronization between the BS modem card 200 and the remote RF unit 210. If another remote RF unit is cascaded to the remote RF unit 210, the transmit buffer 215 is used for achieving synchronization between the BS modem card 200 and a plurality of cascade remote RF units 210. The transmit buffer 215 uses the time $T_{advanced}$ which is determined by the modem 203 and which is for outputting traffic data at an earlier time, the process delay time $T_{0,process}$ determined by the signal delay computation unit 220, and the cable delay time $T_{0,cable}$ determined by the pulse difference counter #0 206 to determine an internal buffer delay time $T_{0,buffer}$ for buffering the traffic data. Then, the transmit buffer 215 buffers traffic data by the determined time. The time $T_{0,buffer}$ may be determined by the modem 203 or a software block (not shown). The transmit buffer 215 may receive the determined time $T_{0,buffer}$ from the modem 203 or the software block (not shown) and may buffer traffic data by that time.

According to the sync pulse signal output from the pulse generator 202, the signal delay computation unit 220 determines the process delay time $T_{0,process}$ required when traffic data is output from the BS modem card 200 to the antenna of the remote RF unit 210 in a state where the reference cable is connected.

The receive buffer 216 buffers traffic data received from the receiving side through the antenna. Similarly to the transmit buffer 215, the receive buffer 216 is used for achieving synchronization between the BS modem card 200 and the remote RF unit 210. The receive buffer 216 uses the time $T_{advanced}$ which is determined by the modem 203 and which is for outputting traffic data at an earlier time, the process delay time $T_{0,process}$ determined by the modem 203, and the cable delay time $T_{0,cable}$ determined by the pulse difference counter #0 206 to determine an internal buffer delay time $T_{0,buffer}$ for buffering the traffic data. Then, the receive buffer 216 buffers traffic data by the determined time. Herein, the process delay time $T_{0,process}$ used to determine the time $T_{0,buffer}$ is determined by the modem 203, which differs from the process of determining the time $T_{0,buffer}$ in the transmit buffer 215. That is, the modem 203 determines the process delay time $T_{0,process}$ required when the traffic data generated by the signal generator 230 is output from the antenna of the remote RF unit 210 to the BS modem card 200.

According to the sync pulse signal output from the pulse generator 202, the signal generator 230 generates a signal in a state where the reference cable is connected, that is, generates traffic data, and then outputs the generated signal to the receive buffer 216 through the antenna of the remote RF unit 210.

Figure 3:
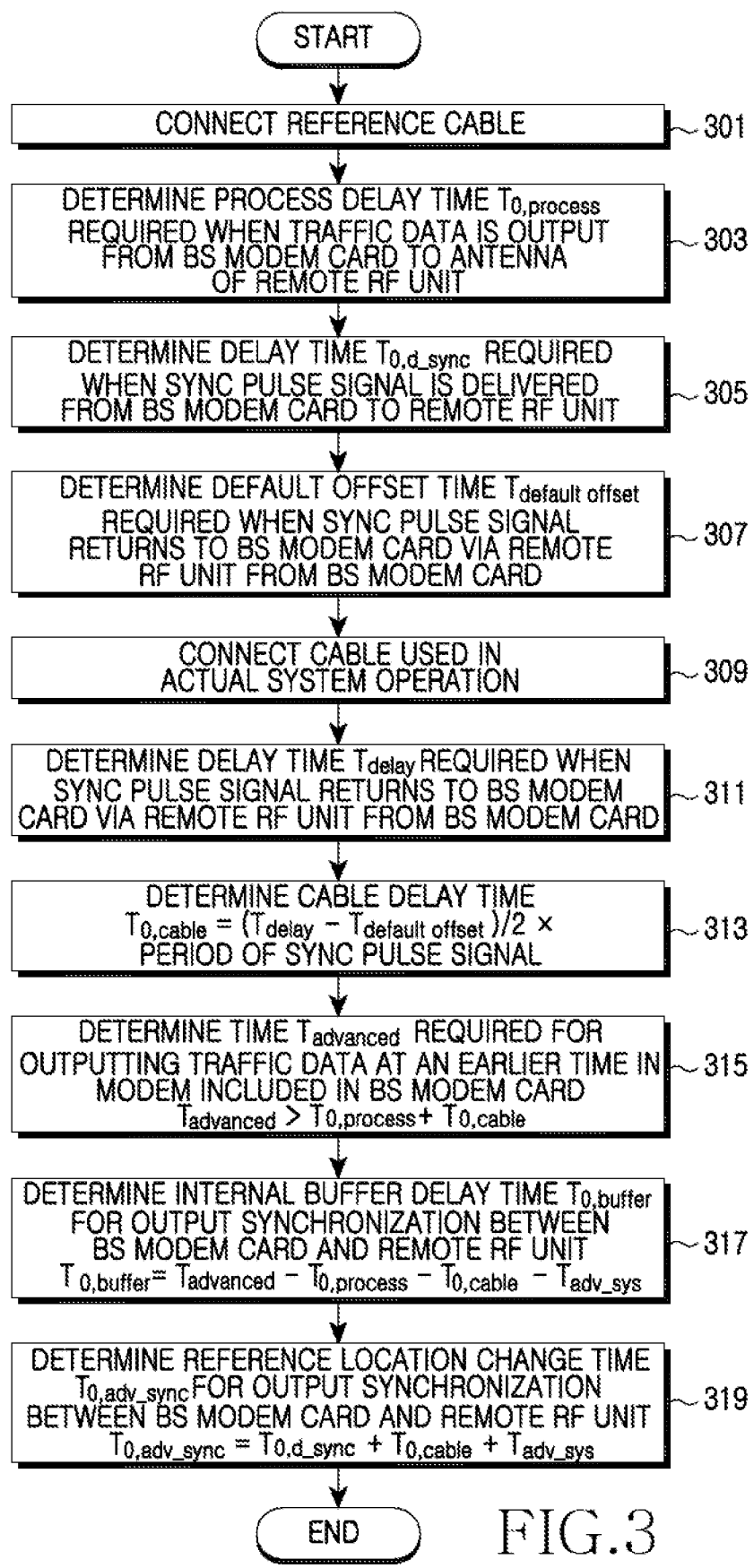
FIG. 3 is a flowchart illustrating a delay time computation and delay compensation method performed by an apparatus for determining a delay time between a BS modem card and a remote RF unit in a broadband wireless access system according to an exemplary embodiment of the present invention.

FIG. 3 is a flowchart illustrating a delay time computation and delay compensation method performed by an apparatus for determining a delay time between a BS modem card and a remote RF unit in a broadband wireless access system according to an exemplary embodiment of the present invention.

Referring to FIG. 3, the BS modem card and the remote RF unit are connected to each other via a reference cable in step 301. The reference cable has a length shorter than a period of a sync pulse signal. For example, the length of the reference cable may be set to satisfy the requirement of Equation (1) below. That is, the reference cable connected between the BS and the remote RF unit has a length short enough to neglect a cable delay time.

$$\text{length of reference cable} < \frac{\text{speed of light}}{\text{period of sync pulse signal}} \cong 0.3 \text{ m/nsec} \quad (1)$$

In step 303, a process delay time $T_{0,process}$ is determined, which is a time required when traffic data is output from the BS modem card to an antenna of the remote RF unit. That is, the determined process delay time is required for signal processing to output the traffic data from the modem to the antenna of the remote RF unit. Since the reference cable has a shorter length than the period of the sync pulse signal, it is assumed that the cable between the BS modem card and the remote RF unit does not have a delay time when determining the process delay time. However, a cable used in actual system operation is different from the reference cable, and thus the cable delay time exists in a real situation. A process of determining the actual cable delay time will be described again in steps 307 to 313.

In step 305, a delay time $T_{0,d\_sync}$ is determined, which is a time required when a sync pulse signal is delivered from the BS modem card to the remote RF unit in a state where the reference cable is connected. The determined delay time $T_{0,d\_sync}$ is used when a reference location change time is determined in step 319.

In step 307, a default offset time $T_{default,offset}$ is determined, which is a time required when the sync pulse signal returns to the BS modem card via the remote RF unit from the BS modem card in a state where the reference cable is connected. Since the reference cable is connected in this state, it is assumed that there is no cable delay time when determining the default offset time $T_{default,offset}$.

In step 309, the cable used in actual system operation is connected by replacing the cable used to connect the BS mode card and the remote RF unit In step 311, a delay time $T_{delay}$ is determined, which is a time required when the sync pulse signal returns to the BS modem card via the remote RF unit from the BS modem card in a state where the cable used in actual system operation is connected. Since the cable used in actual system operation is connected in this state and the signal passes the cable twice, a delay time included in the determined delay time $T_{delay}$ is twice as long as the actual cable delay time.

In step 313, the default offset time $T_{default,offset}$ determined in a state where the reference cable is connected and the delay time $T_{delay}$ determined in a state where the cable used in actual system operation is connected are used to determine a cable delay time $T_{0,cable}$ as expressed by Equation (2) below.

$$T_{0,cable} = (T_{delay} - T_{delay,offset})/2 \times \text{period of sync pulse signal} \quad (2)$$

A difference between the time $T_{delay}$ and the time $T_{default,offset}$ is twice as long as the actual cable delay time. By halving this value, the actual cable delay time $T_{0,cable}$ is obtained.

In step 315, the determined process delay time and the determined cable delay time are used to determine a time $T_{advanced}$, which is a time for outputting traffic data at an earlier time from the modem included in the BS modem card. That is, a time for outputting traffic data at an earlier time from a modem is determined, which is required for matching timing between the BS modem card and the remote RF unit. The time $T_{advanced}$ must satisfy at least the requirement of Equation (3) below.

$$T_{advanced} > T_{0,process} + T_{0,cable} \quad (3)$$

In step 317, the determined time for outputting traffic data at an earlier time, the determined process delay time, and the determined cable delay time are used to determine an internal buffer delay time $T_{0,buffer}$ which is a time for output synchronization between the BS modem card and the remote RF unit, as expressed by Equation (4) below.

$$T_{0,buffer} = T_{advanced} - T_{0,process} - T_{0,cable} - T_{adv\_sys} \quad (4)$$

The time $T_{adv\_sys}$ denotes a system requirement for outputting traffic data at an earlier time or at a later time. The time $T_{0,buffer}$ denotes an internal buffer delay time for output synchronization between the BS modem card and a $1^{st}$ remote RF unit connected to the BS modem card. An interval buffer delay time for output synchronization between the BS modem card and a $2^{nd}$ remote RF unit cascaded to the BS modem card may also be determined in the same manner. In this case, the internal buffer delay time for output synchronization between the BS modem card and the $2^{nd}$ remote RF unit cascaded to the BS modem card may be determined as expressed by Equation (5) below.

$$T_{1,buffer} = T_{advanced} - T_{1,process} - T_{1,cable} - T_{0,cable} - T_{adv\_sys} \quad (5)$$

When a plurality of remote RF units having the same property are cascaded to the BS modem card, Equation (4) and Equation (5) above may be generalized as expressed by Equation (6) below.

$$T_{n,buffer} = T_{advanced} - T_{n,process} - T_{n,cable} - T_{n-1,cable} - \cdots - T_{1,cable} - T_{0,cable} - T_{adv\_sys} \quad (6)$$

In Equation (6), n denotes a remote RF unit index, and indicates a case where n+1 remote RF units are cascaded. The time $T_{n,process}$ may be expressed by Equation (7) below.

$$T_{1,process} = T_{0,process} + (T_{1,process} - T_{0,process})$$

$$T_{2,process} = T_{0,process} + (T_{1,process} - T_{0,process}) + (T_{2,process} - T_{1,process}) \quad (7)$$

When the same remote RF unit is connected, a process delay time generated whenever the remote RF unit is added is constant. Therefore, Equation (7) above may be simplified by Equation (8) below.

$$T_{2,process} = T_{0,process} + 2 \times (T_{1,process} - T_{0,process}) \quad (8)$$

The time $T_{n,process}$ may be generalized by Equation (9) below.

$$T_{n,process} = n \times T_{1,process} - (n-1) \times T_{0,process} \quad (9)$$

Equation (6) above may be generalized by Equation (10) below.

$$T_{n,buffer} = \qquad (10)$$
$$T_{advanced} - nT_{1,process} + (n-1)T_{0,process} - \sum_{0}^{n} T_{n,cable} - T_{adv\_sys}$$

In step 319, the delay time required when the sync pulse signal is delivered from the BS modem card to the remote RF unit and the cable delay time are used to determine a reference location change time $T_{0,adv\_sync}$ for output synchronization between the BS modem card and the remote RF unit by Equation (11) below. That is, an actual delay time of a sync pulse signal used as a reference signal in the remote RF unit is determined by Equation (11) below, and thus the sync pulse signal is synchronized between the BS modem card and the remote RF unit.

$$T_{0,adv\_sync} = T_{0,d\_sync} + T_{0,cable} + T_{adv\_sys} \quad (11)$$

Likewise, when a plurality of remote RF units having the same property are cascaded to the BS modem card, Equation (11) above may be generalized by Equation (12) below.

$$T_{n,adv\_sync} = nT_{1,d\_sync} - (n-1)T_{0,d\_sync} + \sum_{0}^{n} T_{n,cable} + T_{adv\_sys} \quad (12)$$

In Equation (12), n denotes a remote RF unit index, and indicates a case where n+1 remote RF units are cascaded.

Figure 4:
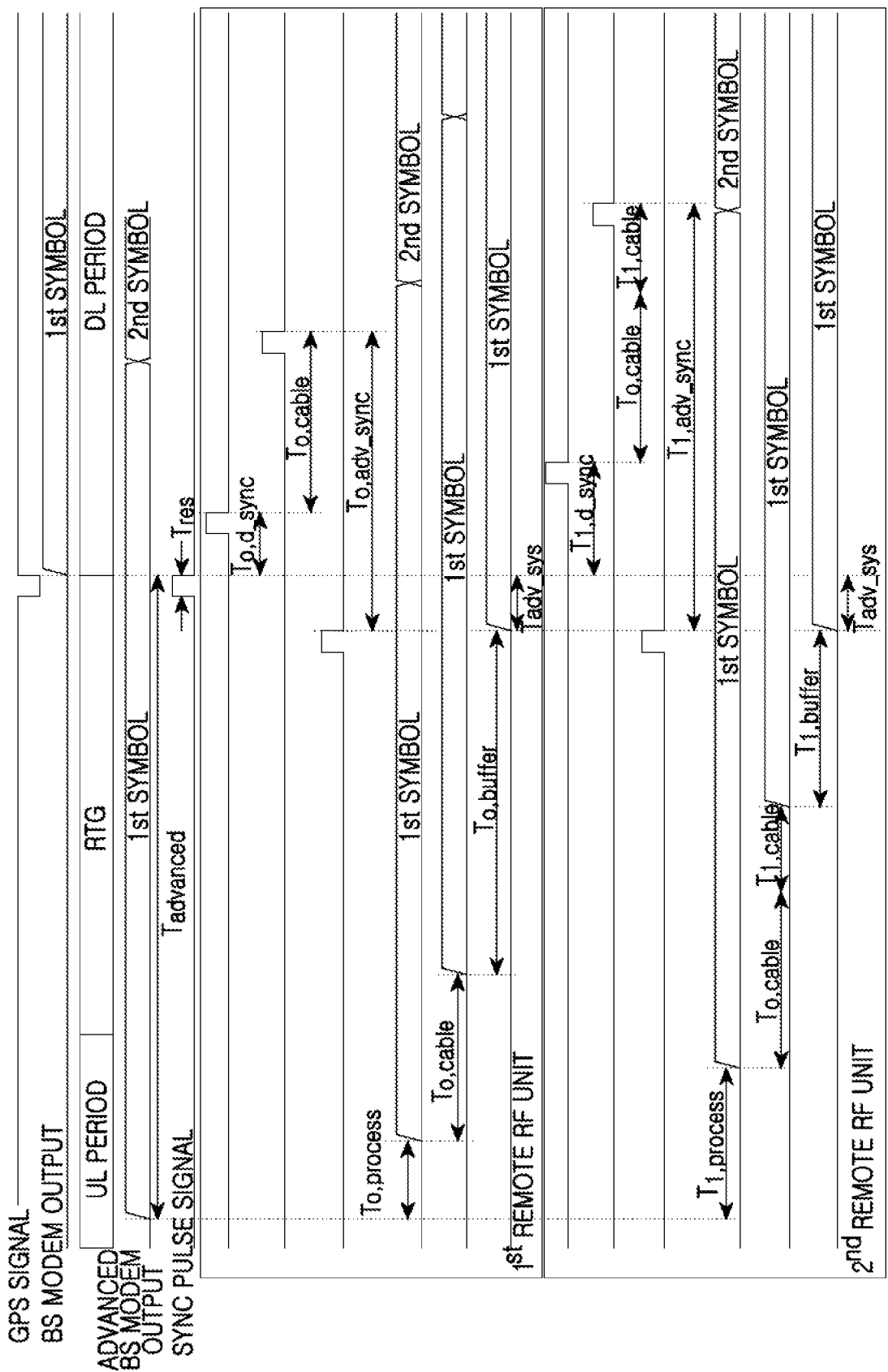
FIG. 4 illustrates an example of timing between a BS modem card and a remote RF unit in a broadband wireless access system according to an exemplary embodiment of the present invention.

Thereafter, the procedure of FIG. 4 ends.

FIG. 4 illustrates an example of timing between a BS modem card and a remote RF unit in a broadband wireless access system according to an exemplary embodiment of the present invention.

Referring to FIG. 4, the BS modem card generates a sync pulse signal $T_{res}$ according to a GPS signal. Then, in order to transmit traffic data to a receiving side through an antenna by achieving synchronization with cascade remote RF units according to the generated sync pulse signal, the BS modem card outputs the traffic data from the modem at a time earlier by a time $T_{advanced}$.

A delay time $T_{0,d\_sync}$ required when the sync pulse signal is delivered from the BS modem card to a $1^{st}$ remote RF unit in a state where the reference cable is connected, a cable delay time $T_{0,cable}$ determined in a state where a cable used in actual system operation is connected, and a time $T_{adv\_sys}$ for outputting traffic data at an earlier time and required in the system are used when the $1^{st}$ remote RF unit directly connected to the BS modem card determines a reference location change time $T_{0,adv\_syn}$ for output synchronization between the BS modem card and the $1^{st}$ remote RF unit. Then, the determined time $T_{0,adv\_sync}$ is used when the $1^{st}$ remote RF unit synchronizes a sync pulse signal between the BS modem card and the $1^{st}$ remote RF unit. Further, the $1^{st}$ remote RF unit receives from the BS modem card the traffic data output from the modem at a time earlier by the time $T_{advanced}$. The traffic data output from the modem is transmitted to the receiving side through the antenna after elapsing a process delay time $T_{0,process}$ required when traffic data is output from the BS modem card to the antenna of the $1^{st}$ remote RF unit in a state where a reference cable is connected, the cable delay time $T_{0,cable}$ determined in a state where the cable used in actual system operation is connected, and an internal buffer delay time $T_{0,buffer}$ for buffering the traffic data.

A delay time $T_{1,d\_sync}$ required when the sync pulse signal is delivered from the BS modem card to a $2^{nd}$ remote RF unit in a state where the reference cable is connected, cable delay times $T_{0,cable}$ and $T_{1,cable}$ determined in a state where the cable used in actual system operation is connected, and a time $T_{adv\_sys}$ for outputting traffic data at an earlier time and required in the system are used when the $2^{nd}$ remote RF unit connected to the $1^{st}$ remote RF unit determines a reference location change time $T_{1,adv\_sync}$ for output synchronization between the BS modem card and the $2^{nd}$ remote RF unit. Then, the determined time $T_{1,adv\_sync}$ is used when the $2^{nd}$ remote RF unit synchronizes a sync pulse signal between the BS modem card and the $2^{nd}$ remote RF unit. Further, the $2^{nd}$ remote RF unit receives from the BS modem card via the $1^{st}$ remote RF unit the traffic data output from the modem at a time earlier by the time $T_{advanced}$. The traffic data output from the modem is transmitted to the receiving side through the antenna after elapsing a process delay time $T_{1,process}$ required when traffic data is output from the BS modem card to the antenna of the $2^{nd}$ remote RF unit in a state where the reference cable is connected, the cable delay times $T_{0,cable}$ and $T_{1,cable}$ determined in a state where the cable used in actual system operation is connected, and an internal buffer delay time $T_{1,buffer}$ for buffering the traffic data.

According to exemplary embodiments of the present invention, delay time determination and delay compensation are performed between a BS and a remote RF unit in a broadband wireless access system by considering a practical design of a broadband wireless access system. Therefore, a problem of the conventional delay compensation system is addressed in which it is very difficult to select and determine a point of computation. In addition, there is an advantage in that synchronization may be achieved between the BS and a plurality of cascade remote RF units, irrespective of the number of the remote RF units.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a delay time to compensate for delay between a Base Station (BS) modem card and a remote Radio Frequency (RF) unit in a wireless access system, the method comprising:
   determining a process delay time required when traffic data is output from the BS modem card to an antenna of the remote RF unit in a state where a reference cable having a length short enough to neglect a cable delay time is connected between the BS modem card and the remote RF unit;
   determining a cable delay time required when a sync pulse signal is transmitted through a cable used in actual system operation between the BS modem card and the remote RF unit; and
   determining a time for outputting traffic data at an earlier time from a modem included in the BS modem card by using the determined process delay time and cable delay time,
   wherein the determining of the cable delay time comprises:
      determining a default offset time required when the sync pulse signal returns to the BS modem card via the remote RF unit from the BS modem card in a state where the reference cable having a length short enough to neglect the cable delay time is connected between the BS modem card and the remote RF unit; and
      determining a delay time required when the sync pulse signal returns to the BS modem card via the remote RF unit from the BS modem card in a state where the cable used in actual system operation is connected between the BS modem card and the remote RF unit.

2. The method of claim 1, wherein the length of the reference cable is determined to satisfy the requirement of the equation:

$$\text{length of reference cable} < \frac{\text{speed of light}}{\text{period of sync pulse signal}} \cong 0.3 \text{ m/nsec.}$$

3. The method of claim 1, wherein the cable delay time is determined by the equation:

$$T_{0,cable} = (T_{delay} - T_{default,offset})/2 \times \text{period of sync pulse signal}$$

where $T_{0,cable}$ denotes the cable delay time, $T_{delay}$ denotes a delay time required when the sync pulse signal returns to the BS modem card via the remote RF unit from the BS modem card in a state where the cable used in actual system operation is connected between the BS modem card and the remote RF unit, and $T_{default,offset}$ denotes a default offset time required when the sync pulse signal returns to the BS modem card via the remote RF unit from the BS modem card in a state where the reference cable having a length short enough to neglect the cable delay time is connected between the BS modem card and the remote RF unit.

4. The method of claim 1, wherein the time for outputting the traffic data at an earlier time is determined to satisfy the requirement of the equation:

$$T_{advanced} > T_{0,process} + T_{0,cable},$$

where $T_{advanced}$ denotes the time required for outputting traffic data at an earlier time, $T_{0,process}$ denotes the process delay time, and $T_{0,cable}$ denotes the cable delay time.

5. The method of claim 1, further comprising:
   determining an internal buffer delay time for output synchronization between the BS modem card and the remote RF unit by using the time for outputting the traffic data at an earlier time, the process delay time, and the cable delay time.

6. The method of claim 5, wherein the interval buffer delay time is determined by the equation:

$$T_{n,buffer} = T_{advanced} - nT_{1,process} + (n-1)T_{0,process} - \sum_{0}^{n} T_{n,cable} - T_{adv\_sys},$$

where n denotes an index of the remote RF unit cascaded to the BS modem card, $T_{n,buffer}$ denotes an internal buffer delay time of an $n^{th}$ remote RF unit, $T_{advanced}$ denotes a time for outputting the traffic data at an earlier time, process denotes a process delay time of a $2^{nd}$ remote RF unit, $T_{0,process}$ denotes a process delay time of a $1^{st}$ remote RF unit, $T_{n,cable}$ denotes a cable delay time of an $n^{th}$ remote RF unit, and $T_{adv\_sys}$ denotes a system requirement for outputting traffic data at an earlier time or a later time.

7. The method of claim 1, further comprising:
   determining a delay time required when the sync pulse signal is delivered from the BS modem card to the remote RF unit in a state where the reference cable having a length short enough to neglect the cable delay time is connected between the BS modem card and the remote RF unit; and
   determining a delay time of the sync pulse signal used as a reference signal in the remote RF unit for output synchronization between the BS modem card and the remote RF unit, by using the determined delay time required when the sync pulse signal is delivered from the BS modem card to the remote RF unit and by using the cable delay time.

8. The method of claim 7, wherein the delay time of the sync pulse signal used as the reference signal in the remote RF unit is determined by the equation:

$$T_{n,adv\_sync} = nT_{1,d\_sync} - (n-1)T_{0,d\_sync} + \sum_{0}^{n} T_{n,cable} + T_{adv\_sys},$$

where n denotes an index of the remote RF unit cascaded to the BS modem card, $T_{adv\_sys}$ denotes a delay time of the sync pulse signal used as the reference signal in an $n^{th}$ remote RF unit, $T_{1,d\_sync}$ denotes a delay time required when the sync pulse signal is delivered from the BS modem card to the $2^{nd}$ remote RF unit in a state where the reference cable having a length short enough to neglect the cable delay time is connected between the BS modem card and the remote RF unit, $T_{0,d\_sync}$ denotes a delay time required when the sync pulse signal is delivered from the BS modem card to the $1^{st}$ remote RF unit in a state where the reference cable having a length short enough to neglect the cable delay time is connected between the BS modem card and the remote RF unit, $T_{n,cable}$ denotes a cable delay time of the $n^{th}$ remote RF unit, and $T_{adv\_sys}$ denotes a system requirement for outputting traffic data at an earlier time or at a later time.

9. The method of claim 1, further comprising:
determining a reference location change time for outputting synchronization between the BS modem card and the remote RF unit,
wherein, the delay time required when the sync pulse signal is delivered from the BS modem card to the remote RF unit and the cable delay time are used to determine the reference location change time.

10. The method of claim 9, wherein the reference location change time is determined by the equation:

$$T_{0,adv\_sync} = T_{0,d\_sync} + T_{0,cable} + T_{adv\_sys},$$

where $T_{0,adv\_sync}$ denotes a reference location change time, $T_{0,d\_sync}$ denotes a delay time required when the sync pulse signal is delivered from the BS modem card to the $1^{st}$ remote RF unit in a state where the reference cable having a length short enough to neglect the cable delay time is connected between the BS modem card and the remote RF unit, $T_{0,cable}$ denotes a cable delay time, and $T_{adv\_sys}$ denotes a system requirement for outputting traffic data at an earlier time or a later time.

11. An apparatus for determining a delay time to compensate for delay between a Base Station (BS) modem card and a remote Radio Frequency (RF) unit in a wireless access system, the apparatus comprising:
a signal delay computation unit for determining a process delay time required when traffic data is output from the BS modem card to an antenna of the remote RF unit in a state where a reference cable having a length short enough to neglect a cable delay time is connected between the BS modem card and the remote RF unit;
a first pulse difference counter for determining a cable delay time required when a sync pulse signal is transmitted through a cable used in actual system operation between the BS modem card and the remote RF unit; and
a modem, included in the BS modem card, for determining a time for outputting traffic data at an earlier time from the modem included in the BS modem card by using the determined process delay time and cable delay time,
wherein the first pulse difference counter determines a default offset time required when the sync pulse signal returns to the BS modem card via the remote RF unit from the BS modem card in a state where the reference cable having a length short enough to neglect the cable delay time is connected between the BS modem card and the remote RF unit, and determines a delay time required when the sync pulse signal returns to the BS modem card via the remote RF unit from the BS modem card in a state where the cable used in actual system operation is connected between the BS modem card and the remote RF unit.

12. The apparatus of claim 11, wherein the length of the reference cable is determined to satisfy the requirement of the equation:

$$\text{length of reference cable} < \frac{\text{speed of light}}{\text{period of sync pulse signal}} \cong 0.3 \text{ m/nsec.}$$

13. The apparatus of claim 11, wherein the cable delay time is determined by the equation:

$$T_{0,cable} = (T_{delay} - T_{default,offset})/2 \times \text{period of sync pulse signal}$$

where $T_{0,cable}$ denotes the cable delay time, $T_{delay}$ denotes a delay time required when the sync pulse signal returns to the BS modem card via the remote RF unit from the BS modem card in a state where the cable used in actual system operation is connected, and $T_{default,offset}$ denotes a default offset time required when the sync pulse signal returns to the BS modem card via the remote RF unit from the BS modem card in a state where the reference cable having a length short enough to neglect the cable delay time is connected between the BS modem card and the remote RF unit.

14. The apparatus of claim 11, wherein the time for outputting the traffic data at an earlier time is determined to satisfy the requirement of the equation:

$$T_{advanced} > T_{0,process} + T_{0,cable},$$

where $T_{advanced}$ denotes the time required for outputting traffic data at an earlier time, $T_{0,process}$ denotes the process delay time, and $T_{0,cable}$ denotes the cable delay time.

15. The apparatus of claim 11, further comprising:
a buffer, included in the remote RF unit, for determining an internal buffer delay time for output synchronization between the BS modem card and the remote RF unit by using the time for outputting the traffic data at an earlier time, the process delay time, and the cable delay time.

16. The apparatus of claim 15, wherein the interval buffer delay time is determined by the equation:

$$T_{n,buffer} = T_{advanced} - nT_{1,process} + (n-1)T_{0,process} - \sum_{0}^{n} T_{n,cable} - T_{adv\_sys},$$

where n denotes an index of the remote RF unit cascaded to the BS modem card, $T_{n,buffer}$ denotes an internal buffer delay time of an $n^{th}$ remote RF unit, $T_{advanced}$ denotes a time for outputting the traffic data at an earlier time, $T_{1,process}$ denotes a process delay time of a $2^{nd}$ remote RF unit, $T_{0,process}$ denotes a process delay time of a $1^{st}$ remote RF unit, $T_{n,cable}$ denotes a cable delay time of an $n^{th}$ remote RF unit, and $T_{adv\_sys}$ denotes a system requirement for outputting traffic data at an earlier time or a later time.

17. The apparatus of claim 11, further comprising:
a second pulse difference counter for determining a delay time required when the sync pulse signal is delivered from the BS modem card to the remote RF unit in a state where the reference cable having a length short enough to neglect the cable delay time is connected between the BS modem card and the remote RF unit and for determining a delay time of the sync pulse signal used as a reference signal in the remote RF unit for output synchronization between the BS modem card and the remote RF unit, by using the determined delay time required when the sync pulse signal is delivered from the BS modem card to the remote RF unit and by using the cable delay time.

18. The apparatus of claim 17, wherein the delay time of the sync pulse signal used as the reference signal in the remote RF unit is determined by the equation:

$$T_{n,adv\_sync} = nT_{1,d\_sync} - (n-1)T_{0,d\_sync} + \sum_{0}^{n} T_{n,cable} + T_{adv\_sys},$$

where n denotes an index of the remote RF unit cascaded to the BS modem card, $T_{adv\_sys}$ denotes a delay time of the sync pulse signal used as the reference signal in an $n^{th}$ remote RF unit, $T_{1,d\_sync}$ denotes a delay time required when the sync pulse signal is delivered from the BS modem card to the $2^{nd}$ remote RF unit in a state where the reference cable having a length short enough to neglect the cable delay time is connected between the BS modem card and the remote RF unit, $T_{0,d\_sync}$ denotes a delay time required when the sync pulse signal is delivered from the BS modem card to the $1^{st}$ remote RF unit in a state where the reference cable having a length short enough to neglect the cable delay time is connected between the BS modem card and the remote RF unit, $T_{n,cable}$ denotes a cable delay time of the nth remote RF unit, and $T_{adv\_sys}$ denotes a system requirement for outputting traffic data at an earlier time or at a later time.

19. The apparatus of claim 11, further comprising:
a second pulse difference counter for determining a reference location change time for outputting synchronization between the BS modem card and the remote RF unit, and
wherein the delay time required when the sync pulse signal is delivered from the BS modem card to the remote RF unit and the cable delay time are used to determine the reference location change time.

20. The apparatus of claim 19, wherein the reference location change time is determined by the equation:

$$T_{0,adv\_sync} = T_{0,d\_sync} + T_{0,cable} + T_{adv\_sys},$$

where $T_{0,adv\_sync}$ denotes a reference location change time, $T_{0,d\_sync}$ denotes a delay time required when the sync pulse signal is delivered from the BS modem card to the $1^{st}$ remote RF unit in a state where the reference cable having a length short enough to neglect the cable delay time is connected between the BS modem card and the remote RF unit, $T_{0,cable}$ denotes a cable delay time, and $T_{adv\_sys}$ denotes a system requirement for outputting traffic data at an earlier time or a later time.

* * * * *